(12) United States Patent
Koeppe et al.

(10) Patent No.: US 7,116,519 B2
(45) Date of Patent: Oct. 3, 2006

(54) PATTERNING OF INTEGRATED CLOSURE FOR IMPLEMENTING PADS CONNECTED TO LAPPING ELEMENTS

(75) Inventors: Peter VanderSalm Koeppe, San Diego, CA (US); Jason Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 10/737,674

(22) Filed: Dec. 15, 2003

(65) Prior Publication Data

US 2005/0128638 A1 Jun. 16, 2005

(51) Int. Cl.
*G11B 5/48* (2006.01)
(52) U.S. Cl. .................... 360/129; 121/281
(58) Field of Classification Search .............. 360/281
See application file for complete search history.

(56) References Cited

U.S. PATENT DOCUMENTS

| 4,689,877 | A |   | 9/1987  | Church ..................... 29/603 |
| 4,914,868 | A |   | 4/1990  | Church et al. ............ 51/165.71 |
| 5,065,483 | A | * | 11/1991 | Zammit .................... 29/603.09 |
| 5,175,938 | A | * | 1/1993  | Smith ........................... 33/567 |
| 5,321,882 | A | * | 6/1994  | Zarouri et al. ............ 29/603.07 |
| 5,361,547 | A |   | 11/1994 | Church et al. ................. 451/5 |
| 5,588,199 | A | * | 12/1996 | Krounbi et al. ............. 29/603.1 |
| 5,738,566 | A |   | 4/1998  | Li et al. ........................ 451/28 |
| 5,883,770 | A |   | 3/1999  | Biskeborn et al. ..... 360/130.21 |
| 5,905,613 | A |   | 5/1999  | Biskeborn et al. ..... 360/130.21 |
| 6,027,397 | A | * | 2/2000  | Church et al. .................. 451/1 |
| 6,193,584 | B1 |  | 2/2001  | Rudy et al. ..................... 451/5 |
| 6,195,871 | B1 |  | 3/2001  | Watanuki ................. 29/603.09 |
| 6,522,499 | B1 | * | 2/2003  | Takayama et al. .......... 360/129 |
| 6,623,330 | B1 | * | 9/2003  | Fukuroi ........................ 451/5 |
| 6,728,067 | B1 | * | 4/2004  | Crawforth et al. ....... 360/234.3 |
| 6,758,722 | B1 | * | 7/2004  | Zhu ............................... 451/5 |
| 6,950,289 | B1 | * | 9/2005  | Lam et al. .................. 360/316 |
| 7,016,143 | B1 | * | 3/2006  | Kirschenbaum et al. .. 360/77.12 |
| 2002/0173227 | A1 | * | 11/2002 | Lam et al. ..................... 451/5 |
| 2004/0179310 | A1 | * | 9/2004  | Lam et al. .................. 360/316 |
| 2005/0105220 | A1 | * | 5/2005  | Iben ........................... 360/323 |
| 2006/0007579 | A1 | * | 1/2006  | Kirschenbaum et al. ...... 360/75 |

FOREIGN PATENT DOCUMENTS

JP 2001087819 4/2001

* cited by examiner

*Primary Examiner*—Jefferson Evans
(74) *Attorney, Agent, or Firm*—Zilka-Kotab, PC (57) ABSTRACT

A tape head comprised of a substrate and a closure coupled to the substrate. Read and/or write elements are embedded in the substrate. Contact pads are coupled to the substrate, the pads being in electrical communication with the read and/or write elements. At least one lapping element is embedded in the substrate. Supplemental pads are coupled to the substrate, the supplemental pads being in electrical communication with at least one lapping element. A tape head according to another embodiment includes a substrate, a patterned (e.g. generally U-shaped, rectangular, etc.) closure formed on the substrate, read and/or write elements embedded in the substrate, and two rows of contact pads coupled to the substrate, the pads being in electrical communication with the read and/or write elements.

23 Claims, 7 Drawing Sheets

PATTERNING OF INTEGRATED CLOSURE FOR IMPLEMENTING PADS CONNECTED TO LAPPING ELEMENTS

FIELD OF THE INVENTION

The present invention relates to magnetic tape head fabrication, and more particularly, this invention relates to tape head structure having an integrated closure and supplemental pads connected to elements acting as lapping guides.

BACKGROUND OF THE INVENTION

Figure 1:
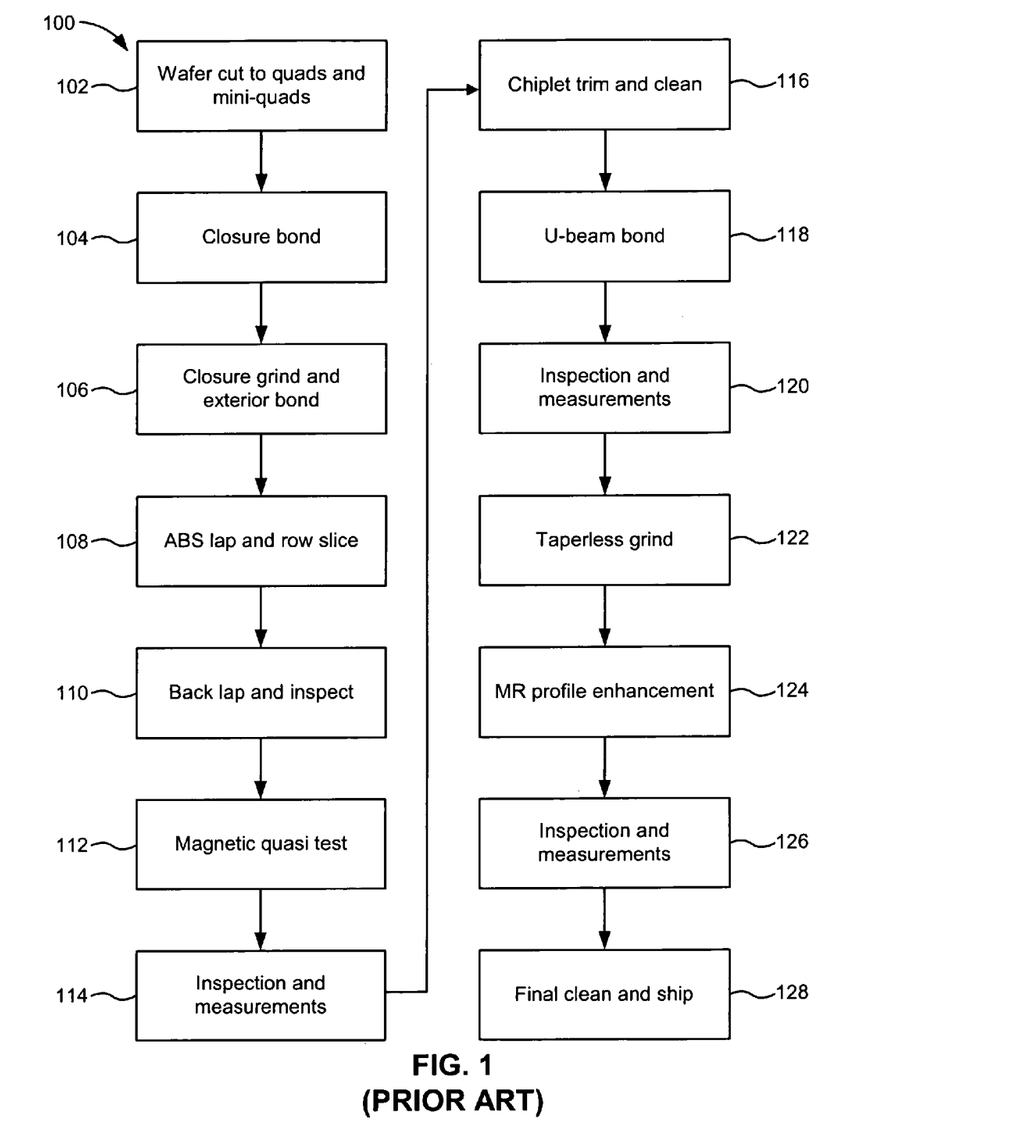
FIG. 1 illustrates a method of manufacturing a conventional tape head for a linear tape drive.

Prior Art FIG. 1 illustrates a method 100 of manufacturing a conventional tape head for a linear tape drive. As shown, in operation 102, a plurality of "quads" is cut from a wafer, which may be further cut into "mini-quads." Thereafter, a plurality of closures is bonded to the mini-quads. See operation 104. Next, in operation 106, the closures are ground and an extender bond operation is performed. At this point, in operation 108, an air bearing surface (ABS) is lapped, after which the mini-quad is sliced to provide a plurality of "rows" each with a planar ABS.

With continuing reference to FIG. 1, a back portion of each row is lapped and inspected. See operation 110. The rows are then subjected to a magnetic test in operation 112, followed by additional inspections and measurements in operation 114. It is at this time that the rows are trimmed to afford "chiplets" and cleaned in operation 116.

To provide the clean "chiplets" with support, they are bonded to U-beams in operation 118 and again inspected and measured in operation 120. A taper-less grind is then carried out in operation 122 to notch a portion of each head. Such taper-less grind is carried out in order to reduce the area on which a tape passes during use. By doing so, the tape is guided over the head in an optimal manner.

Finally, in operations 124–128, a magnetoresistive profile of each head is enhanced and again inspected and measured, after which a final cleaning operation is performed. More information regarding a number of the foregoing operations will be set forth with reference to the following figures.

Figure 2:
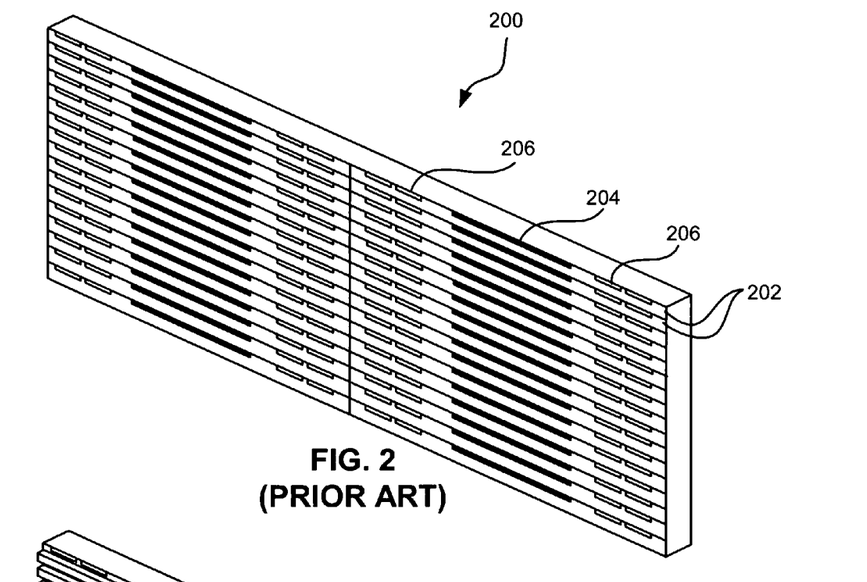
FIG. 2 illustrates a mini-quad of heads that have been cut from a wafer.

Prior art FIG. 2 illustrates a mini-quad 200 of heads 202 that have been cut from a wafer, in accordance with operation 102 of FIG. 1. As shown, the mini-quad 200 includes two columns of multiple rows of heads 202. During the fabrication of the mini-quad 200, an array of heads 202 including read and write elements, auxiliary circuits, pads 204 coupled to the elements, and pads 206 coupled to the auxiliary circuits are fabricated on a common substrate in a deposition of metallic and non-metallic layers. The auxiliary circuits are sometimes referred to as electrical lap guides (ELGs), and are currently positioned away from the elements towards opposite ends of the head 202. Patterning of the array of elements, ELGs, pads, and connections therebetween is accomplished using photolithography in combination with etching and lift-off processes. During lapping of operation 110 (FIG. 1), the pads 206 are attached to a resistance measuring device that determines an extent of the lapping based on a change in resistance of the ELGs. Note that the pads 206 are much larger than pads 204. This is because the connection to the resistance measuring device is not a permanent connection, but is rather accomplished using a biased pin or similar coupling mechanism.

Figure 3:
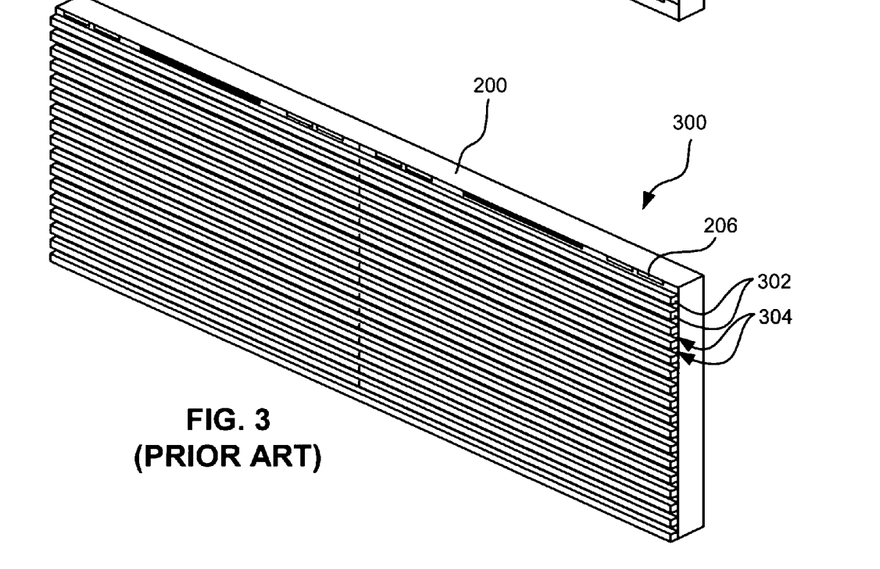
FIG. 3 illustrates a mini-quad including a plurality of strips of closures attached thereto.

Prior art FIG. 3 illustrates a mini-quad 300 including a plurality of strips of closures 302 attached thereto, in accordance with operations 104 and 106 of FIG. 1. Such closures 302 define a plurality of slots 304 in which the pads 206 associated with the ELGs reside. Such closures 302 have recently become a common part of wafer processing in view of the benefits they afford in resultant heads. More information on the manufacture and use of closures 302 and the related benefits may be found with reference to U.S. Pat. Nos. 5,883,770 and 5,905,613 which are incorporated herein by reference in their entirety.

Figure 4:
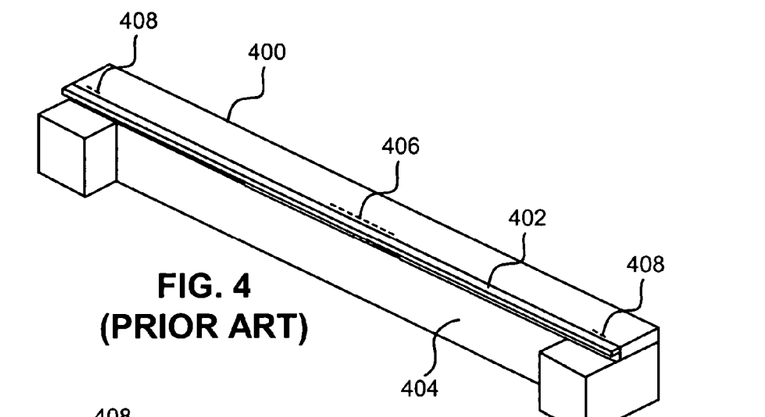
FIG. 4 illustrates a head after the lapping and tests, the trimming, and the attachment of the U-beam of FIG. 1.

Prior art FIG. 4 illustrates a head 400 after the lapping and tests of operations 108–114, the trimming of operation 116 and the attachment of the U-beam of operation 118 of FIG. 1. To conserve wafer utilization, the head 400 is extremely thin in shape and form. The elements 406 are positioned towards the middle of the head 400 and the ELGs 408 are positioned towards opposite ends of the head 400. In order to increase the stability of the head 400 for the suitable use thereof, the head 400 is attached to a beam 404 of some sort formed of a rigid material. Such beams 404 are often referred to as a "U-beams." Again, the closure 402 is shown in FIG. 4.

Figure 5:
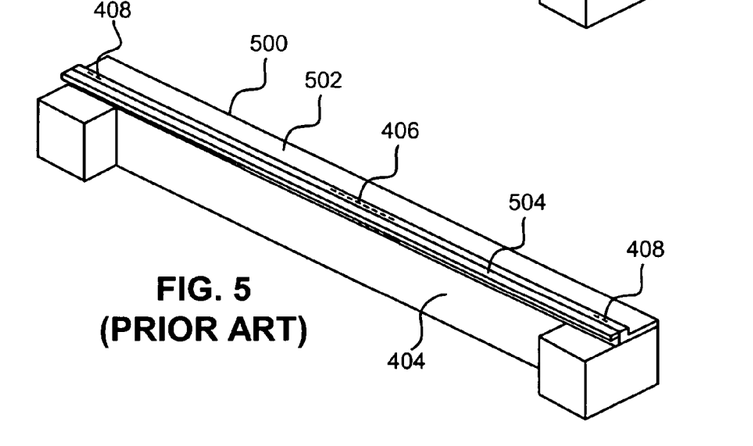
FIG. 5 illustrates a head after the taper-less grind operation of FIG. 1.

Prior art FIG. 5 illustrates a head 500 after the taper-less grind of operation 122 of FIG. 1. Such taper-less grind renders a notch 502 which allows a proper wrap angle of a tape as it moves over an ABS 504 of the head 500 during use.

Figure 6:
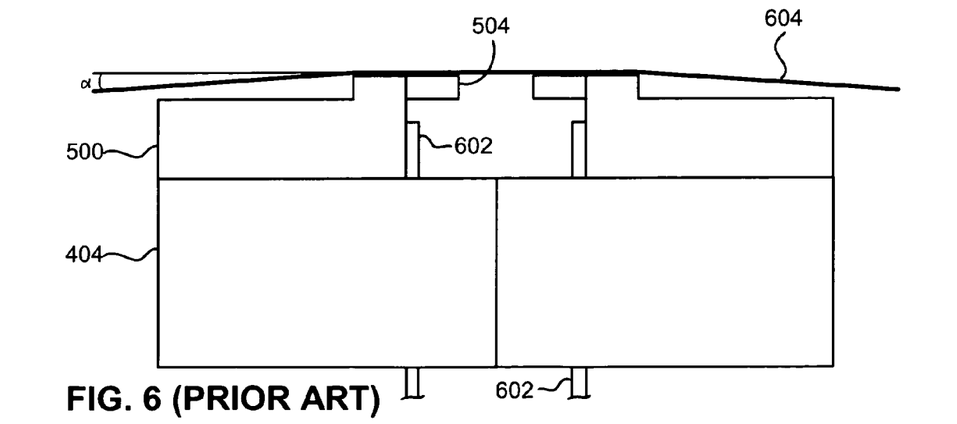
FIG. 6 illustrates two heads of FIG. 5 in use.

Prior art FIG. 6 illustrates the coupling of two heads 500 of FIG. 5 in use. Specifically, in FIG. 6, two heads 500 are mounted on U-beams 404 which are, in turn, adhesively coupled. Cables 602 are fixedly coupled to the pads 204. The tape 604 wraps over the heads 500 at a predetermined wrap angle α.

As shown, FIG. 6 illustrates the head 500 for a read-while-write bidirectional linear tape drive. "Read-while-write" means that the read element follows behind the write element. This arrangement allows the data just written by the write element to be immediately checked for accuracy and true recording by the following read element.

As mentioned above, during head fabrication, the head is lapped down to its designed stripe height. In order for the lapping tool to know when it has reached its targeted stripe height, the prior art method measures the resistance of the ELGs placed at the top and bottom ends of the head, fairly distant from the active read and write elements. However, due to variations in head surface geometry and instabilities inherent in the lapping process, the center active read and write elements are not lapped accurately to the targeted stripe height and throat height. Based on the current track sizes, these inaccuracies are still acceptable. However, as tracks become smaller and smaller, and tolerances for the target stripe height become tighter and tighter, a new solution is required.

One solution would be to use the read elements as the lapping guides. However, the pads 204 coupled to the read elements are too small to make reliable contact with the contacts of the resistance measuring device. The contacts of the resistance measuring device are not fixedly attached to the pads but are typically biased pins that rely on friction for maintaining contact. The lapping process is rough and can cause the module to shift or vibrate, which in turn creates a tendency of the contacts to shift and lose contact with the pads 204. Compounding the problem, the contacts of the resistance measuring device are typically larger than the pads 204, and therefore can contact adjacent pads 204, creating a short.

Because of these problems, standard practice is to place the ELGs on the outer ends of the module and only uses those as lapping guides. The ELGs are coupled to the large pads 206 positioned outside the pads 204 due to the small available area for pad placement. The extent of lapping at the ends of the head can be accurately determined by the changing resistance through the ELGs. What cannot be accurately measured, however, is the extent of lapping in the middle of the head, i.e., between the ELGs. Current tape modules are 22 mm in length. However, the elements only span about 3 mm, meaning that the lapping measurements are taken very far away from the active area of the head. Tolerances are in microns, and are very sensitive, so it becomes harder to lap within the tolerances, and will become harder as the stripe heights of the elements become smaller in future generations of heads.

What is thus needed is a solution for reliable lapping that is also capable of achieving a tight stripe height and throat height tolerance for a magneto-resistive head.

SUMMARY OF THE INVENTION

The present invention overcomes the drawbacks and limitations described above by providing a tape head comprised of a substrate and a closure coupled to the substrate. Read and/or write elements are embedded in the substrate. Contact pads are coupled to the substrate, the pads being in electrical communication with the read and/or write elements. At least one lapping element is embedded in the substrate. Supplemental pads are coupled to the substrate, the supplemental pads being in electrical communication with at least one lapping element.

In one embodiment, at least one lapping element is also one of the read elements. The supplemental pads can be connected directly to at least one lapping element (which is also the read element). The supplemental pads can also be connected to the contact pads of those elements functioning as lapping guides.

Where separate lapping elements are used, they are preferably positioned towards the read and/or write elements as opposed to towards an end of the head to provide a better indication of lapping in the area of interest, i.e., the portion of the head surrounding the elements.

In an embodiment, the closure is formed on the substrate. One preferred material for the closure is AlFeSil (Sendust). Preferably, the closure is generally U-shaped, the closure partially surrounding at least one of the contact pads and supplemental pads.

Preferably, the supplemental pads have a larger exposed surface area than the contact pads, making the connection to a lapping measuring device more reliable.

A tape head according to another embodiment includes a substrate, a closure formed on the substrate, read and/or write elements embedded in the substrate, and multiple rows of contact pads coupled to the substrate, the pads being in electrical communication with the read and/or write elements. The closure may be generally U-shaped, rectangular, etc. Preferably, the closure is shaped such that there is room for multiple rows of contact pads while achieving sufficient adhesiveness between the closure and substrate.

Again, the closure is preferably formed from Sendust, and preferably partially surrounds at least one of the contact pads and supplemental pads. Here again, one or more of the read elements can function as a lapping element.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior art

Prior art

Prior art

Prior art

Prior art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides a way for the ELG lapping elements to be placed right next to the active elements or to use the active read elements themselves as a monitor for the stripe height. The main advantage of this method is to minimize the effects of surface geometry on the measurements of stripe height during lapping, and thus achieve a much tighter stripe height tolerance.

The invention preferably uses a Compression Zone Adaptive Recording head design which includes a deposited Sendust (AlFeSil) layer as the head closure rather than the traditional glued-on AlTiC closure piece. The invention calls for the Sendust layer to be patterned in such a way that it allows the placement of additional large gold pads on top of the normal reader/writer gold pads. These large gold pads have the option of connecting to additional ELGs placed next to the active elements or to the normal gold pads, which in turn are connected to the reader elements. During lapping, the large gold pads can be used to probe the resistance of the element, and thus serve as a measurement of the stripe height.

Figure 7:
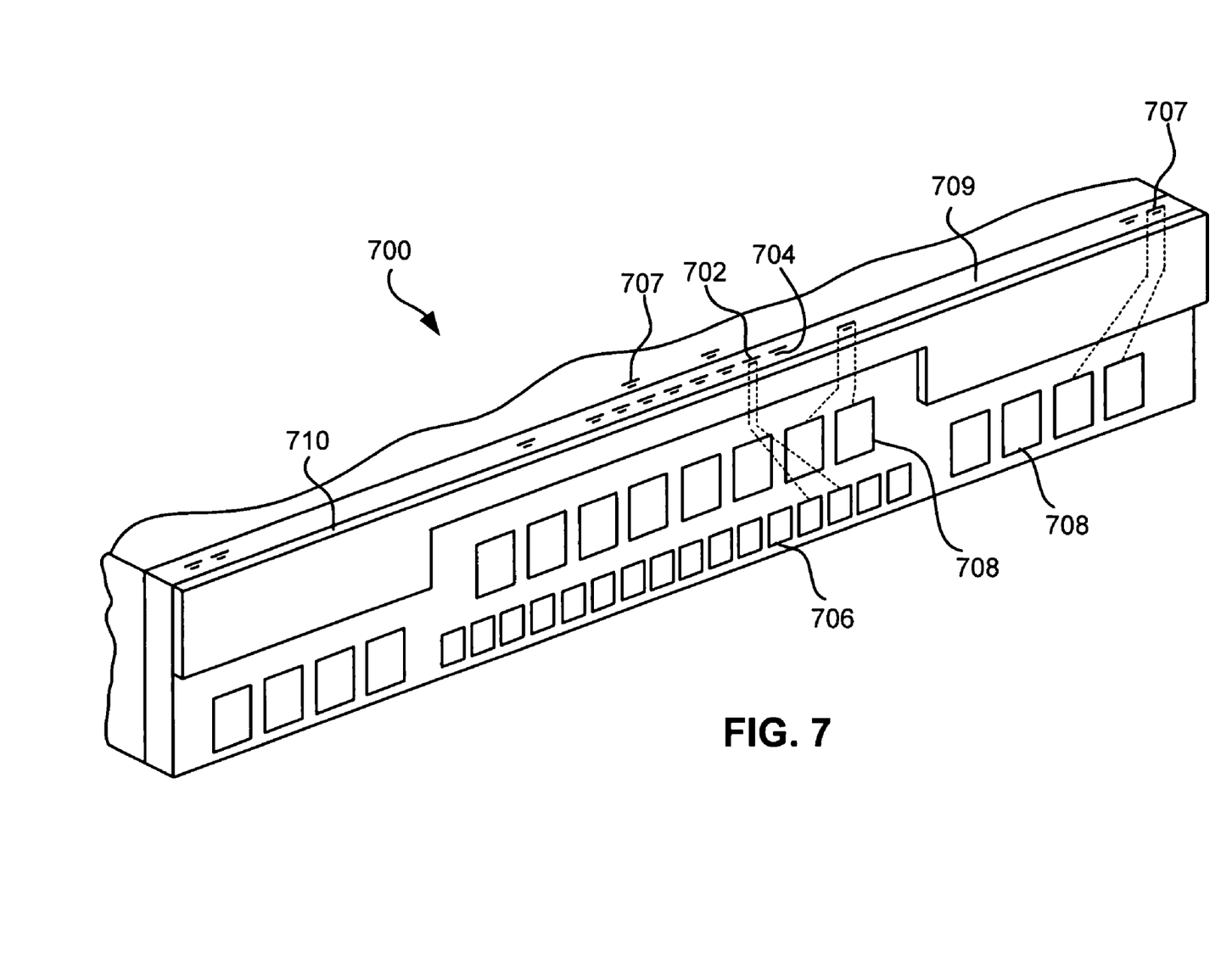
FIG. 7 illustrates a module according to one embodiment.

FIG. 7 illustrates a module 700 formed with read and write elements 702, 704 exposed on a tape bearing surface of the module 700, a portion of the module 700 acting as a substrate for the various components of the module 700. ELGs 707 positioned towards the elements 702, 704 as opposed to at opposite ends of the module 700. Because the ELGs 707 are positioned towards the elements, the extent of lapping near the elements can be precisely controlled. Note also that additional ELGs 707 can also be positioned near the ends of the module 700 to ensure a consistent flat profile across the tape bearing surface 709 of the module 700.

Contact pads 706 in communication with the elements 702, 704 via conductive straps are formed. Supplemental pads 708 in communication with the ELG's 707 via conductive straps are also formed at a position above the contact pads 706.

As mentioned above, the contact pads 706 are too small to make reliable contact with the contacts of the test circuit that measures the resistance. Therefore, the supplemental pads 708 have a larger exposed surface than the contact pads 706. The reason for using the larger supplemental pads 708 is because once the wafer is sliced, it is lapped. The extent of lapping determines the height of the elements in a direction into the tape bearing surface. The way to determine the extent of lapping is to measure resistance of the ELGs 707 or elements 702 themselves. The resistance increases as more of the module is removed, indicating the amount of material removed.

Figure 8:
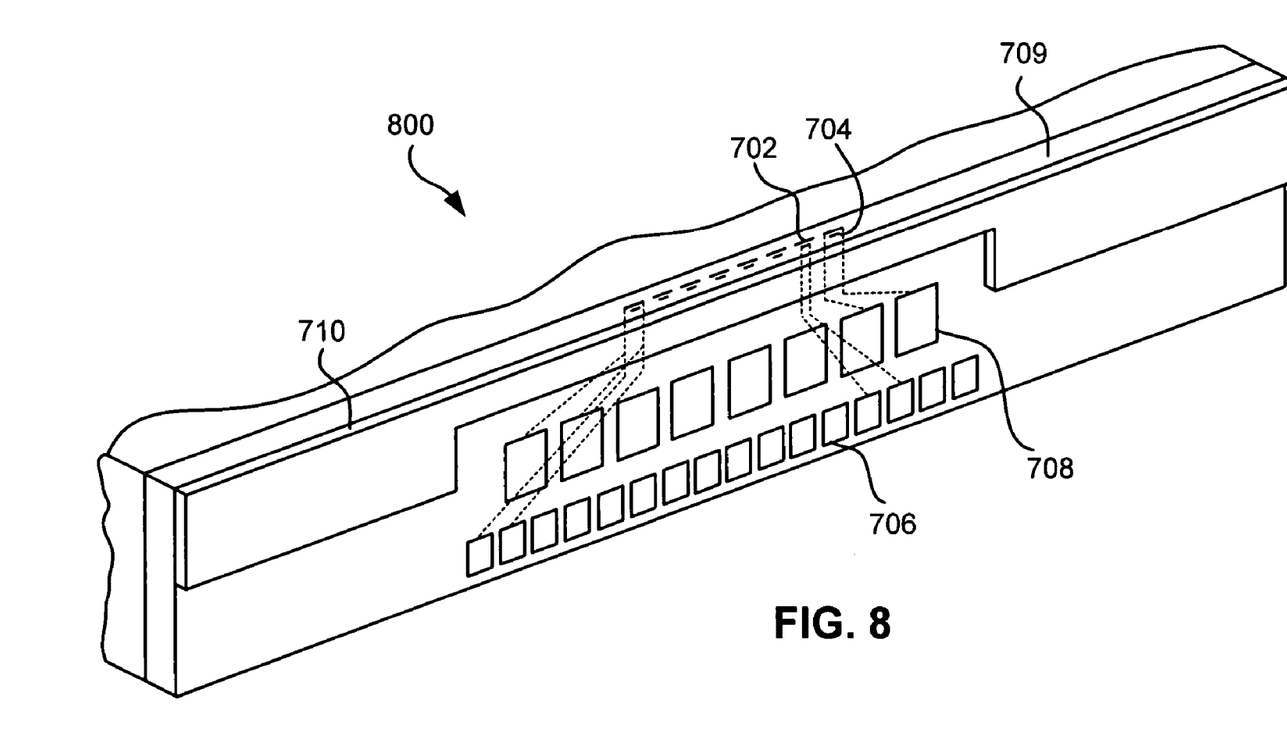
FIG. 8 illustrates a module according to another embodiment.

FIG. 8 illustrates another embodiment 800 of the present invention that uses some or all of the elements 702 themselves as the lapping guides. In this embodiment, the larger supplemental pads 708 are directly connected to some or all of the actual read elements 702 (in parallel with the connections of the contact pads to the elements) and/or to the coupling connecting the contact pads to the elements, allowing the tester to measure the lapping in the area of interest, i.e., at the span of elements 702, 704, by measuring the resistance changes of the elements 702 during lapping. Because the supplemental pads 708 are connected directly to the elements 702 (or the straps between the elements and contact pads 706), the supplemental pads 708 can be formed in the same way as the contact pads 706.

Figure 9:
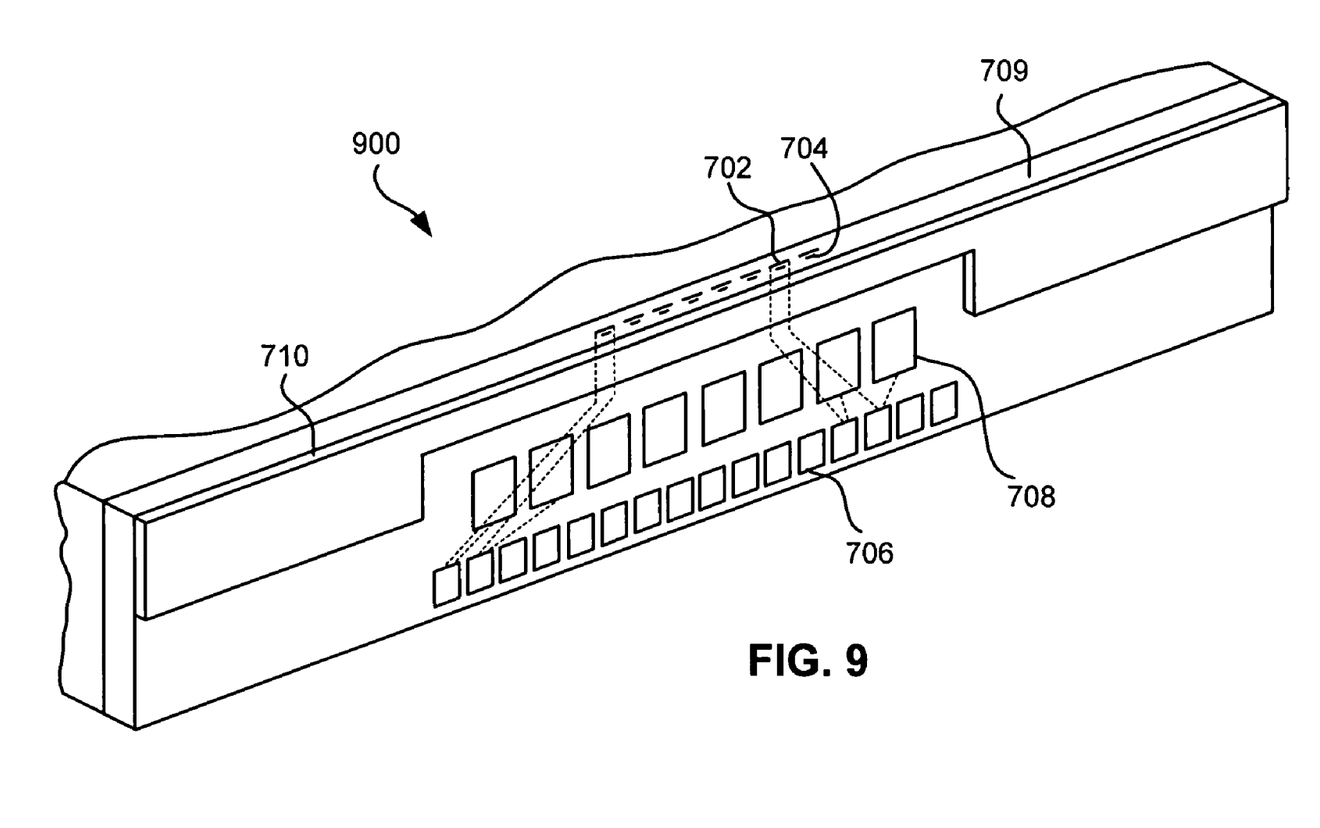
FIG. 9 illustrates a module according to yet another embodiment.

FIG. 9 illustrates yet another embodiment 900 of the present invention that again uses some or all of the elements 702 themselves as the lapping guides. However, in this embodiment, the supplemental pads 708 are connected to the lower pads as opposed to being directly connected to the elements 702. Here, the supplemental pads 708 are formed with straps to the contact pads 706 using a conventional masking process.

Note that in any of the above embodiments, the supplemental pads 708 may be disconnected from the contact pads 706 after lapping to prevent the supplemental pads 708 acting as antennae for noise and electrical charges.

Note that the supplemental pads 708 can also be formed by printing the supplemental pads 708 and straps onto the side of the module 700.

Because the portion of the module 700 containing the elements 702, 704 is soft, a piece of hard material (closure) must be added to protect it. Rather than putting a separate closure on, as described above with reference to the prior art, a layer of hard material (e.g., Sendust) 710 is deposited at the wafer level to protect the module 700. The closure layer 710 can be added by photolithography and sputter deposition, for example. This bypasses the need to adhere a separate closure piece to the module 700, which is very expensive and time consuming.

The integral closure 710 provides a further advantage, that of reduced spatial area. Because the integral closure 710 can be made smaller, more room for pads exists. Current modules have eight elements. Future generations will have sixteen elements. Thus, the size of the pads will have to be reduced, or the spatial area for their placement increased, in order to accommodate the large number of pads necessary to provide a circuit to each element.

The closure 710 may be electrically conductive, and is preferably in electrical communication with the base material of the substrate. A preferred material for the substrate of the module 700 is alumina-titanium carbide ($Al_2O_3$—TiC).

A preferred shape of the closure 710 is shown in FIGS. 7–9. As shown, the unique U-shape of the closure 710 leaves room for additional pads on the side of the module 700. Note, though, that other shapes are possible, as long as the tape bearing surface of the closure 710 is hard and able to support the tape while achieving sufficient adhesiveness between the closure and substrate so that it does not easily become detached. Also note that conventional closures can still be used in the present invention, though with greater difficulty due to the need to adhere each individual closure piece to the module 700.

Figure 10:
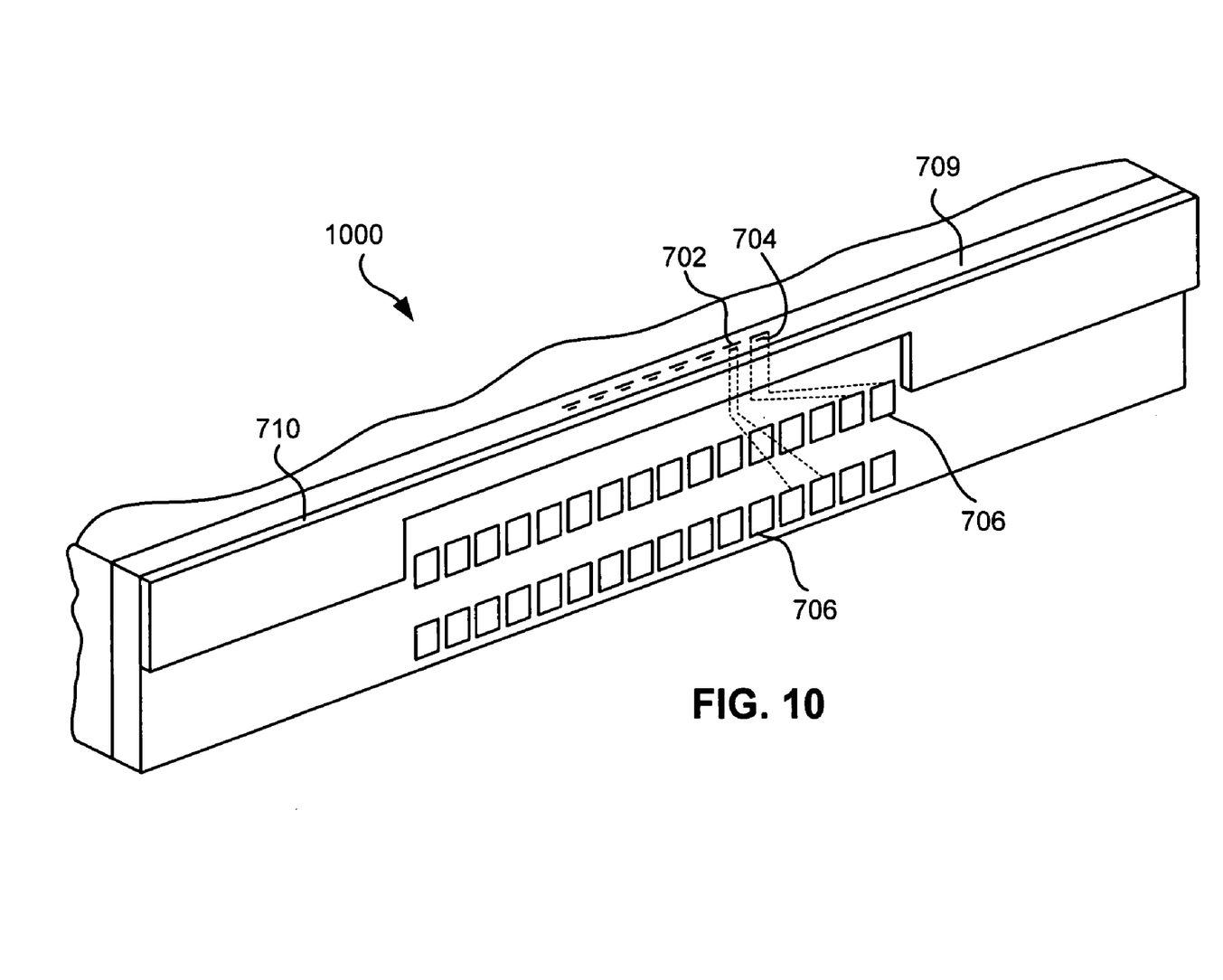
FIG. 10 illustrates a module according to an alternate embodiment.

FIG. 10 depicts a module 1000 according to an alternate embodiment of the present invention, now made possible because of the thinner profile of the integral module 710. In this embodiment, two rows of contact pads 706 are formed on the side of the module 700. Because the contact pads 706 can be formed in two rows, the size of the contact pads 706 can be made larger. Again, the elements 702 themselves may be used as the lapping guides. Note that using this embodiment, the width of the head can be substantially reduced.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. A tape head, comprising:
   a substrate;
   a closure coupled to the substrate;
   read and/or write elements embedded in the substrate;
   contact pads coupled to the substrate, the pads being in electrical communication with the read and/or write elements;
   at least one lapping element embedded in the substrate; and
   supplemental pads coupled to the substrate, the supplemental pads being in electrical communication with at least one lapping clement.

2. The head as recited in claim 1, wherein at least one lapping element is also one of the read elements.

3. The head as recited in claim 2, wherein the supplemental pads are connected directly to at least one lapping element.

4. The head as recited in claim 2, wherein the supplemental pads are connected to the contact pads.

5. The head as recited in claim 2, wherein the supplemental pads were at one time connected to the contact pads.

6. The head as recited in claim 1, wherein at least one lapping element is towards the read and/or write elements.

7. The head as recited in claim 1, wherein the closure is formed on the substrate.

8. The head as recited in claim 7, wherein the closure is formed from Sendust.

9. The head as recited in claim 7, wherein the closure is patterned.

10. The head as recited in claim 7, wherein the closure is electrically conductive.

11. The head as recited in claim 10, wherein the closure is in electrical communication with a base material of the substrate.

12. The head as recited in claim 11, wherein the substrate base material is alumina-titanium carbide.

13. The head as recited in claim 1, wherein the supplemental pads have a larger exposed surface than the contact pads.

14. A tape drive system, comprising:
   a magnetic head as recited in claim 1;
   a drive mechanism for passing a magnetic recording tape over the magnetic head; and a controller electrically coupled to the magnetic head for controlling a voltage of the conducting circuit of the magnetic head.

15. A tape head, comprising:
a substrate;
a closure formed on the substrate;
read and/or write elements embedded in the substrate;
at least two rows of contact pads coupled o the substrate, the pads being in electrical communication with the read and/or write elements,
wherein the closure is formed from Sendust.

16. The head as recited in claim 15, wherein the closure partially surrounds at least one of the contact pads and supplemental pads.

17. The head as recited in claim 15, wherein at least one of the read elements functions as a lapping element.

18. A tape head, comprising:
a substrate;
a closure formed on the substrate;
read and/or write elements embedded in the substrate;
a first row of contact pads coupled to the s substrate, the pads being in electrical communication with a portion of the read and/or write elements; and
a second row of contact pads coupled to the substrate, the pads being in electrical communication with another portion of the read and/or write elements;
wherein the closure is generally U-shaped, the closure partially surrounding at least one of the contact pads and supplemental pads.

19. The head as recited in claim 18, wherein the closure is formed from Sendust.

20. The head as recited in claim 18, Wherein at least one of the read elements functions as a lapping element.

21. The head as recited in claim 20, wherein any contact pads in communication with the at least one of read elements functioning as the lapping elements have a larger exposed surface than other contact pads.

22. The head as recited in claim 18, further comprising at least one lapping element embedded in the substrate; and supplemental pads coupled to the substrate, the supplemental pads being in electrical communication with the at least one lapping element.

23. A tape drive system, comprising:
a magnetic head as recited in claim 18;
a drive mechanism for passing a magnetic recording tape over the magnetic head; and
a controller electrically coupled to the magnetic head for controlling a voltage of the conducting circuit of the magnetic head.

* * * * *